No. 738,760. Patented September 15, 1903.

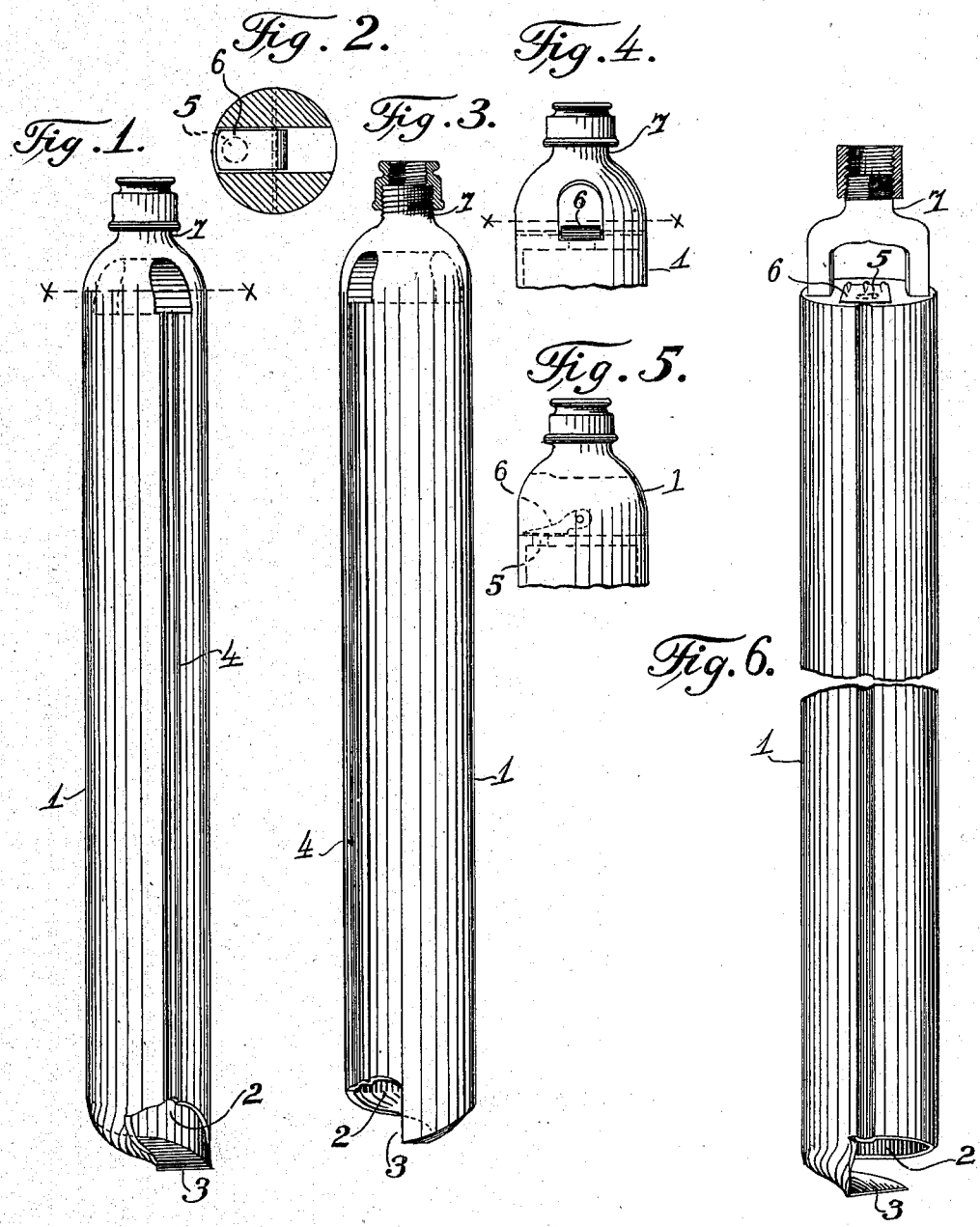

UNITED STATES PATENT OFFICE.

ABRAM MARKHAM BEVIER, OF SUPERIOR, WISCONSIN.

EARTH-BORING AUGER.

SPECIFICATION forming part of Letters Patent No. 738,760, dated September 15, 1903.

Application filed February 16, 1903. Serial No. 143,580. (No model.)

*To all whom it may concern:*

Be it known that I, ABRAM MARKHAM BEVIER, a citizen of the United States, residing at Superior, in the county of Douglas and State of Wisconsin, have invented certain new and useful Improvements in Earth-Boring Augers; and I do hereby declare the following to be a full, clear, and exact description of the invention, such as will enable others skilled in the art to which it appertains to make and use the same.

My invention relates to earth-boring augers, and has for its object the provision of an auger adapted to bore into earth at considerable depths and to lift a core of the substance bored through.

With this and other objects in view it consists of a cylinder open at the bottom and provided at its lower end with a boring-point and having a vertical passage formed in its wall adapted to permit the flow of water or other liquid or gas from above said cylinder to below the same.

It also comprises a port and valve at the upper end of said cylinder adapted to permit the passage of water or other liquid from within said cylinder and to prevent the entry of water to said cylinder from above the same.

It also comprises certain other constructions, combinations, and arrangements of parts, as will be hereinafter described and claimed.

In the drawings, Figure 1 is a perspective view of my said invention. Fig. 2 is a horizontal section on the line $x$ $x$ of Fig. 1. Fig. 3 is another perspective view of said invention. Fig. 4 is a rear elevation of a portion of said invention. Fig. 5 is a side elevation of said portion. Fig. 6 is a perspective view of the opposite ends of a slightly-modified form of my said invention broken in the center.

In the drawings, 1 is a cylinder, wholly or partly open at its lower end, as at 2, provided at said lower end with a boring-point or cutter 3 of any suitable construction, pitch, or contour, adapted to bore into the earth or other substance and to lift a core of the material through which it passes into said cylinder. A vertically-arranged passage of any suitable construction, open at each end, separated in any suitable manner from the main bore of said cylinder, and preferably taking the form of an exterior groove formed in the wall of said cylinder, as at 4, extends from the upper end of said cylinder to the lower end thereof and is adapted to permit the passage of water or other liquid or gas from above said cylinder to the bore formed in the earth or other penetrated substance below the same, whereby the formation of a vacuum below said cylinder is avoided and the sucking out of the contents thereof prevented and whereby the lifting of said cylinder is greatly facilitated. The upper end of said cylinder is closed, except that a port 5 is formed therein, which port is normally closed by a valve 6 of any suitable construction, adapted to permit the flow of water of other liquid from within said cylinder and to prevent the flow of water or other liquid into said cylinder from above the same. Said cylinder is further provided at its upper end with a head 7 of any suitable construction, adapted to engage a tubular or other suitable operating-rod extending to the surface of the ground and in turn operated by any well-known means to turn said auger. In my said invention the boring-point forms a continuation of said cylinder and may be integral with said cylinder or rigidly secured thereto, in which construction the turning of the cylinder in boring operates to smooth or plaster up the walls of the material bored through, and thereby greatly reduces the tendency of said walls to cave.

In operation said auger is turned into the earth or other material to be bored until said cylinder is filled with said material, whereupon said auger is lifted and emptied and the operation resumed as before. As the implement descends deeper into the earth the operating-rod is lengthened from time to time, as required. Should water flow into or rise in the bore formed by said implement in the earth, it escapes past said cylinder through the groove 4 as the auger is withdrawn, thus avoiding suction below the cylinder upon the contents thereof. When said auger is lowered into water, thus filling the cylinder therewith, said water is forced out of the top of the cylinder through the port 5 as the solid matter bored through is lifted into the cylinder by the boring-point. If quicksand is encountered, clay in sufficient quantities is packed into the bored hole and in many instances will form a dam to hold back the sand, in which event the boring may be continued through and beyond said clay. My invention is especially designed for prospecting for minerals, but may also be used for many other purposes.

While I have shown and described certain forms of my said auger, it is obvious that it may be modified or altered in certain details within the scope and spirit of my said invention.

Having now described my said invention, what I claim, and desire to secure by Letters Patent, is—

1. In an auger, the combination of a cylinder, open at one end and provided at such end with a boring-point forming a continuation thereof, and having a port formed in its opposite end, and an outwardly-opening valve adapted to govern said port.

2. In an auger, the combination of a cylinder open at one end and provided at such end with a boring-point adapted to turn therewith, and having a port formed in its opposite end, an outwardly-opening valve adapted to govern said port, said cylinder being further formed with a head adapted to engage an operating-rod, substantially as described.

3. In an auger, the combination of a cylinder open at one end and provided at such end with a boring-point, and provided with a passage open at each end and extending from one to the other end of said cylinder and separated from the main bore of said cylinder, said cylinder being further formed with a head adapted to engage an operating-rod, substantially as described.

4. In an auger, the combination of a cylinder, open at one end and provided at such end with a boring-point, and provided further, with a passage open at each end and extending from one to the other end of said cylinder and separated from the main bore or compartment of said cylinder, said cylinder being further formed with a head adapted to engage an operating-rod, and being further formed with a port in its upper end, an outwardly-opening check-valve, adapted to govern said port, and to permit liquid or gas to escape from said cylinder and to prevent the entrance of liquid or gas thereto from above the same, substantially as described.

5. In an auger, the combination of a cylinder, open at one end and provided at such end with a boring and coring terminal, and provided, further, with a passage open at each end and extending from one to the other end thereof and separated from the main bore or compartment of said cylinder, said cylinder being further formed with a head adapted to engage an operating-rod, or rod-connecting thimble, and being further formed with a port in the end opposite from said boring-point, and an outwardly-opening check-valve, adapted to govern said port, substantially as described.

6. In an auger the combination of a cylinder open at one end and provided at such end with a boring and coring terminal adapted to raise a core of the material bored through into said cylinder, said cylinder being provided with a port in its opposite end, and having formed in the external face of its wall a groove or concave corrugation, open at each end and extending from one to the other end of said cylinder, means for governing said port to permit the escape of liquid or gas from said cylinder and to prevent the entry of liquid or gas thereto through said port, and means adapted to connect said cylinder to an operating-rod, substantially as described.

7. A cylinder open at one end and provided at such end with a boring terminal and further provided with a passage open at each end extending from one to the other end thereof and separated from the main compartment or bore of said cylinder, said cylinder having a port formed therein at the opposite end from said boring-point, and being further provided with a head adapted to engage operating means, and means for governing said port to permit liquid or gas to escape from said cylinder and to prevent the entry of liquid or gas thereto through said port.

In testimony whereof I hereunto affix my signature in presence of two witnesses.

ABRAM MARKHAM BEVIER.

Witnesses:
A. J. WENTZEL,
JAMES T. WATSON.